United States Patent
Uchino (10) Patent No.: US 7,076,405 B1
(45) Date of Patent: Jul. 11, 2006

(54) METHOD FOR ESTIMATING POWER CONSUMPTION AND NOISE LEVELS OF AN INTEGRATED CIRCUIT, AND COMPUTER-READABLE RECORDING MEDIUM STORING A PROGRAM FOR ESTIMATING POWER CONSUMPTION AND NOISE LEVELS OF AN INTEGRATED CIRCUIT

(75) Inventor: Taku Uchino, Los Angeles, CA (US)

(73) Assignee: Kabushiki Kaisha Toshiba, Kawasaki (JP)

( * ) Notice: Subject to any disclaimer, the term of this patent is extended or adjusted under 35 U.S.C. 154(b) by 1220 days.

(21) Appl. No.: 09/661,919

(22) Filed: Sep. 14, 2000

(30) Foreign Application Priority Data

Sep. 17, 1999 (JP) ............................... P11-264538

(51) Int. Cl.
*G06G 17/10* (2006.01)
(52) U.S. Cl. .............................. 703/2; 703/13; 703/14; 716/1; 716/2; 716/4
(58) Field of Classification Search .................... 703/2, 703/13, 14; 716/2, 1, 4
See application file for complete search history.

(56) References Cited

U.S. PATENT DOCUMENTS

| | | | | |
|---|---|---|---|---|
| 5,557,531 A | * | 9/1996 | Rostoker et al. | 716/1 |
| 5,682,320 A | * | 10/1997 | Khouja et al. | 716/4 |
| 5,847,966 A | * | 12/1998 | Uchino et al. | 716/2 |
| 5,872,471 A | * | 2/1999 | Ishibashi et al. | 327/98 |
| 5,966,523 A | * | 10/1999 | Uchino | 703/2 |
| 6,272,663 B1 | * | 8/2001 | Uchino | 716/2 |
| 6,324,679 B1 | * | 11/2001 | Raghunathan et al. | 716/18 |
| 6,363,515 B1 | * | 3/2002 | Rajgopal et al. | 716/5 |

OTHER PUBLICATIONS

"Power Estimation Techniques for Integrated Circuits", Najm, Proceedings International Conference on CAD, IEEE 1995.*

(Continued)

*Primary Examiner*—Kevin J. Teska
*Assistant Examiner*—Fred Ferris
(74) *Attorney, Agent, or Firm*—Finnegan, Henderson, Farabow, Garrett & Dunner, L.L.P.

(57) ABSTRACT

The present invention is related to a method for estimating power consumption and noise levels of an integrated circuit which is composed of logic gates connected in the form of a plurality of stages. (1) At the outset, output signal waveforms and occurrence probabilities thereof at the first stage of the logic gates are calculated by the use of signal waveforms and occurrence probabilities thereof at primary input terminals of the integrated circuit; (2) next, output signal waveforms and occurrence probabilities thereof at the second stage of the logic gates are calculated by the use of the output signal waveform and the occurrence probability thereof at the primary input terminals and the output signal waveform and the occurrence probability thereof at the first stage of the logic gates; and (3) then, output signal waveforms and occurrence probabilities thereof at the n-th stage (n is a natural number) of the logic gates are calculated by the use of the output signal waveform and the occurrence probability thereof at the primary input terminals and the output signal waveform and the occurrence probability thereof at the (n-1)th stage of the logic gates. Thereby, types of the respective elementary waveforms, occurrence probabilities and signal correlations are calculated relating to signals located on each wiring of each stage inside of the integrated circuit and occurring within a predetermined time period.

18 Claims, 6 Drawing Sheets

OTHER PUBLICATIONS

Power Minimization in IC Design: Principles and Applications, Pedram, ACM Tranactions on Design Automation, vol. 1, No. Jan. 1996.*

Najm et al.; "Probabilistic Simulation for Reliability Analysis of CMOS VLSI Circuits", IEEE Transactions on Computer-Aided Design, vol. 9, No. 4, pp. 439-450, (1990).

Tsui et al.; "Efficient Estimation of Dynamic Power Consumpton Under a Real Delay Model", International Conference on Computer-Aided Design, pp. 224-228, (1993).

Uchino et al.; "Switching Activity Analysis using Boolean Approximation Method", International Conference on Computer-Aided Design, pp. 20-25, (1995).

Copy of U.S. Appl. No. 09/312,828, Now US Patent No. 6,272,663.

* cited by examiner

METHOD FOR ESTIMATING POWER CONSUMPTION AND NOISE LEVELS OF AN INTEGRATED CIRCUIT, AND COMPUTER-READABLE RECORDING MEDIUM STORING A PROGRAM FOR ESTIMATING POWER CONSUMPTION AND NOISE LEVELS OF AN INTEGRATED CIRCUIT

CROSS-REFERENCE TO RELATED APPLICATIONS

This application is based upon and claims the benefit of priority from the prior Japanese Patent Application No. 11-264538, filed Sep. 17, 1999, the entire contents of which are incorporated herein by reference.

BACKGROUND OF THE INVENTION

1. Field of the Invention

The present invention is related to a method for estimating power consumption and noise levels of an integrated circuit and, more particularly, a method of estimating power consumption and noise levels of an integrated circuit taking into consideration the signal waveform, the signal probability and the signal correlation on the respective signal lines within an integrated circuit.

2. Description of the Related Art

It becomes possible to manufacture very large scale integrated circuits with the advent of micromachining techniques for LSI circuits. However, the miniaturization of the circuits and the increase in the scale of integration results in the increase in noise level and the increase in power consumption. If the noise level increases, it takes much time to solve the noise problem, rendering the LSI relatively expensive. Also, if the power consumption is increased, the battery provided for an electric appliance is quickly used up for a shorter time while it becomes necessary to provide an expensive heat dissipation package. Accordingly, at the initial stages of a designing procedure, it becomes necessary to estimate the noise level and the electric power as consumed.

The circuit operation inside of the LSI chip has to be investigated for the purpose of estimating the noise level and the electric power as consumed. This is because noise and power consumption ensues from the operation of circuits, i.e., motion of electric charge. One of conventional techniques most usually employed and available for investigating the operation of circuits is the simulation of the operation by the use of test vectors, i.e., tracing the circuit operation in time series by means of a computer.

For example, most of commercial tools for evaluating the operation of circuits such as VerilogXL, PowerMill and HSPICE have been implemented with this technique. The advantages of the simulation of the operation include high precisions. On the other hand, however, it has a disadvantage of a longer processing time to complete the simulation of the operation. The increase in the scale of integration will require a furthermore longer processing time and therefore the technique making use of the simulation of the operation can not be used for future circuits.

Several techniques implemented on the basis of probability simulation are available as alternatives to the simulation of the operation. Generally speaking, the processing time of a technique implemented on the basis of probability simulation is substantially shorter than that of a technique implemented on the basis of the simulation of the operation. For this reason, the technique implemented on the basis of probability simulation is recognized as a promising technique in the future applicable for very large scale integrated circuits. However, the probability simulation is inferior to the simulation of the operation with respect to the accuracy of the evaluation. Because of this, it is the important point for the technique implemented on the basis of probability simulation to improve the accuracy without increasing the processing time. In the followings, two types of the technique implemented on the basis of probability simulation will be explained, i.e., (1) CREST (CuRent ESTtimator)

(2) BAM (Boolean Approximation Method).

CREST has been published in the paper, F. N. Najm, et.al "Probabilistic Simulation for Reliability Analysis of COMS VLSI Circuits", IEEE Transactions on Computer Aided Design, vol. 9, no. 4, pp. 439–450,1990.

Figure 1:
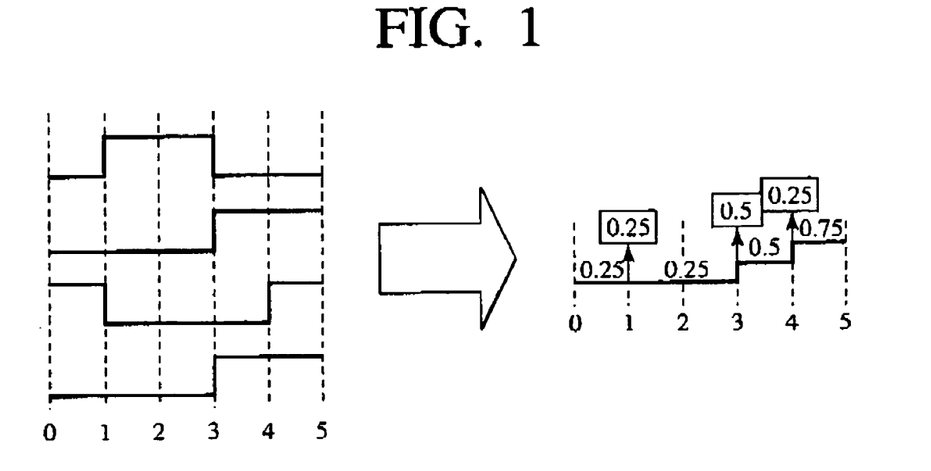
FIG. 1 is a view for explaining the probability waveform which is a basic conceptual feature of the prior art technique (CREST).

The characteristics of CREST is the use of probability waveforms which have been statistically synthesized with a plurality of test vectors. FIG. 1 is a schematic diagram showing an exemplary probability waveform. There are illustrated four test vectors at the left side of a block arrow and a probability waveform as synthesized from these test vectors at the left side of the block arrow. Numerals located above the probability waveform includes numerals in squares indicative of the probabilities that the logic value changes from 0 to 1 at the respective time points, and other numerals indicative of the probabilities that the logic values 1 occur at the respective time points. The processing time of CREST is one thousandth of that of the simulation of the operation (HSPICE). However, since it is difficult to take into consideration the spatial correlation signal, the accuracy of CREST is not improved up to the accuracy of the simulation of the operation.

Figure 2:
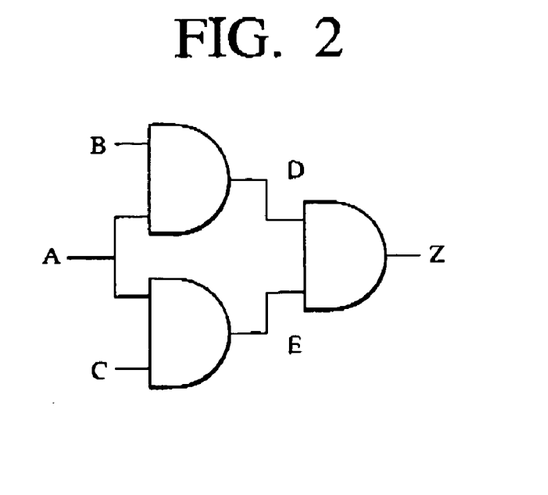
FIG. 2 is a view for explaining a signal correlation which is originating from branch and convergence of a signal.

On the other hand, BAM is a technique taking into consideration the spatial signal correlation as described in U.S. Pat. No. 5,847,966. A typical example of the spatial signal correlation is originating from branch and convergence of a signal. In FIG. 2, there are two paths of a signal to reach the node Z from the node A as A→D→Z and A→E→Z. In such a case, a signal at the node D and a signal at the node E are depending upon the same signal at the node A and therefore they are not indpendent to each other. The correlation between the signal at the node D and the signal at the node E is reflected to the operation of the signal at the node Z and the accuracy of estimation of the noise level and the power consumption. In accordance with BAM, the accuracy is improved by taking into consideration the first order influence of the signal correlation. However, since the signal waveform is not considered in the case of BAM, it is not appropriate to make use of BAM for the purpose of analyzing the noise and the power consumption originating from the signal waveform such as a glitch and so forth (malfunction due to the differential arrival times of relevant signals).

The respective features are summarized in the following Table 1

TABLE 1

| SIMULATION TYPE | PROCESSING TIME | ACCURACY OF ESTIMATION | SIGNAL WAVEFORM | SIGNAL CORRELATION |
|---|---|---|---|---|
| OPERATION PROBABILITY | LONG | HIGH | CONSIDERED | CONSIDERED |
| CREST | SHORT | REL. LOW | CONSIDERED | NOT CONSIDERED |
| BAM | SHORT | REL. LOW | NOT CONSIDERED | CONSIDERED |

As described above, the technique making use of the simulation of the operation can not be used for future circuits because of the longer processing time. On the other hand, while the technique making use of the probability simulation such as CREST, BAM has the advantage that the processing time is short, the accuracy of estimation thereof is not sufficient. Accordingly, there are demands for an appropriate technique taking into consideration both the signal waveform and the signal correlation.

It becomes furthermore increasingly important to consider the signal waveform and the signal correlation at the same time while the miniaturization of circuits has been advanced. One of the reasons thereof is the increase in the ratio of the capacitance between adjacent lines to the entire capacitance driven by signals within the circuit under consideration. By virtue of the capacitance between adjacent lines, the operation of a signal is affected by the operation of another signal. This means that the correlation between different signals must be taken into consideration. The influence of the capacitance between adjacent lines depends upon the interval between the switching times of the signals which are affected each other. This means that signal waveforms must be taken into consideration.

SUMMARY OF THE INVENTION

The present invention is related to a method for estimating power consumption and noise levels of an integrated circuit which is composed of logic gates connected in the form of a plurality of stages. (1) At the outset, output signal waveforms and occurrence probabilities thereof at the first stage of the logic gates are calculated by the use of signal waveforms and occurrence probabilities thereof at input terminals (hereafter called the primary input terminals) of the integrated circuit; (2) next, output signal waveforms and occurrence probabilities thereof at the second stage of the logic gates are calculated by the use of the output signal waveform and the occurrence probability thereof at the primary input terminals and the output signal waveform and the occurrence probability thereof at the first stage of the logic gates; and (3) then, output signal waveforms and occurrence probabilities thereof at the n-th stage (n is a natural number) of the logic gates are calculated by the use of the output signal waveform and the occurrence probability thereof at the primary input terminals and the output signal waveform and the occurrence probability thereof at the (n-1)th stage of the logic gates. Thereby, types of the respective elementary waveforms, occurrence probabilities and signal correlations are calculated relating to signals located on each wiring of each stage inside of the integrated circuit and occurring within a predetermined time period.

The elementary waveforms and the waveform probabilities of all the signals of the circuit can therefore be calculated on the basis of the elementary waveforms and the waveform probabilities of the primary inputs taking into consideration the signal correlation. Because of this, it is possible to quickly and accurately estimate the power consumption and to lessen the circuit development time and quickly select appropriate packages for LSI circuits.

BRIEF DESCRIPTION OF THE DRAWINGS

FIG. 7A through FIG. 7E are views for explaining the differences between the present embodiment of the present invention and CREST; in which

FIG. 9 is a schematic diagram showing an exemplary basic cycle which is divided into two large blocks, each of which is divided again into four small blocks, in which

DETAILED DESCRIPTION OF THE PREFERRED EMBODIMENTS

Hereinbelow, several preferred embodiments in accordance with the present invention will be explained in conjunction with the accompanied drawings.

FIRST EMBODIMENT

First of all, the waveform probability which is a basic conceptual feature of the present invention will be explained in conjunction with FIG. 3.

A signal waveform within a synchronized circuit can be sectioned by a certain time interval (called the basic cycle hereinbelow). In usual cases, the basic cycle is identical to the cycle of the clock signal. The pattern of a waveform within the basic cycle is called a elementary waveform. A signal waveform can be recognized as a series of elementary waveforms sectioned by the basic cycle. The waveform probability of a certain elementary waveform is the probability that the certain elementary waveform appears in a certain cycle P(W) designates the waveform probability of the elementary waveform W as follows $$P(W) = \text{(number of appearance of the elementary waveform } W\text{)/(total number of appearance of all the elementary waveforms)} \quad (1)$$

Figure 3:
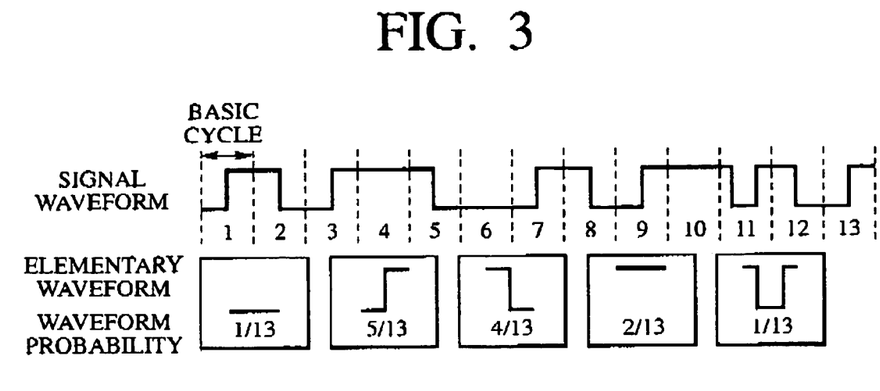
FIG. 3 is a view for explaining the waveform probability which is a basic conceptual feature of the present invention.

For example, in FIG. 3, the elementary waveform that a signal rises from 0 to 1 appears 1st, 3rd, 7th, 9th and 13th basic cycles so that the number of appearance of the elementary waveform is 5 Also, the total number of appearance of all the elementary waveforms is 13. The waveform probability of the elementary waveform rising from 0 to 1 is therefore 5/13.

Figure 4:
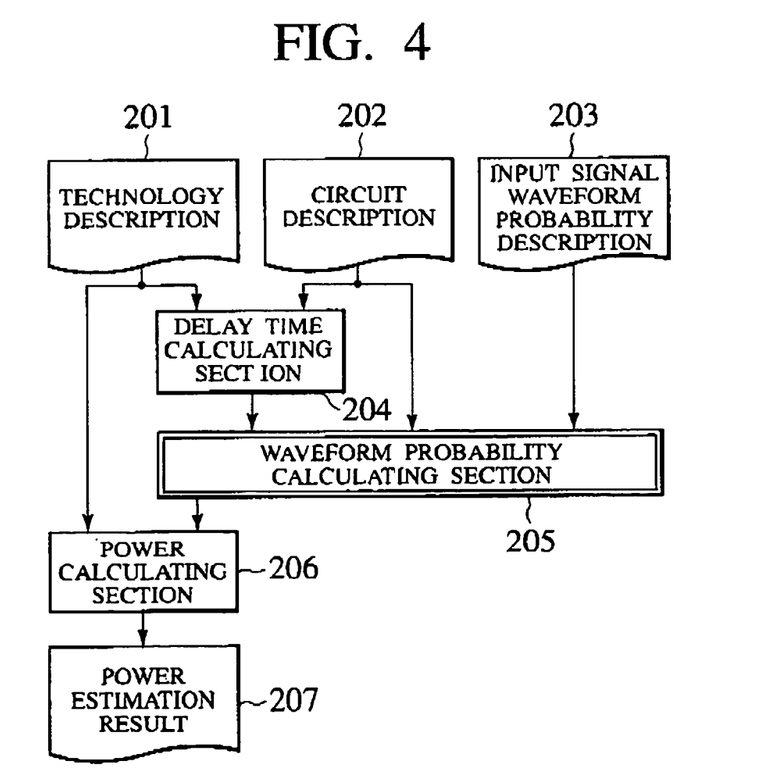
FIG. 4 is a view for explaining the system in accordance with a first embodiment of the present invention.

Next, the power estimation system in accordance with an embodiment of the present invention will be explained in conjunction with FIG. 4. The power estimation system in accordance with this embodiment is different from the power estimation system in accordance with a conventional technique in that it is provided with a function to calculate the waveform probability taking into consideration both the signal waveform and the signal correlation.

The power estimation system in accordance with the present invention is designed to accept a technology description 201, a circuit description 202 and an input signal waveform probability description 203, and composed of a delay time calculating section 204, a waveform probability calculating section 205 and a power calculating section 206, and serves to output a power estimation result 207. These elements will be explained in details.

The technology description 201 contains information indispensable for the power estimation by means of the waveform probability calculating section 205. More specifically speaking, for example, there is provided following information, the parameters for calculating the delay times of signals from the input terminals to the output terminals of a cell;

the capacitances and the resistance per unit length of the wirings; and the power consumption per switching for each terminal of a cell.

The circuit description 202 contains the information about connection among cells (functional units composed of MOS transistors) and nets (metallic lines for connecting cells to each other).

The input signal waveform probability description 203 contains the information about types of elementary waveforms at primary input terminals which are terminals for starting calculation by means of the waveform probability calculating section 205, and the information about the waveform probabilities of the elementary waveforms at the primary input terminals. The primary inputs are given as the input signals to the entirety of the circuit and the output signals from the flip-flops inside of the circuit. The elementary waveforms and the waveform probabilities of the output signals from the flip-flops inside of the circuit can be obtained by means of the simulation of the operation, in which delay times are not taken into consideration, at the initial stages of a designing procedure (RT level and so forth).

The delay time calculating section 204 serves to calculate, on the basis of the circuit description 202 and the technology description 201, the delay time from the input terminal to the output terminal of a cell and the delay time of a signal on a net from the output terminal of one cell to the input terminal of another cell.

The waveform probability calculating section 205 serves to propagate the elementary waveforms and the waveform probabilities of the primary inputs through the inside of the circuit in order to calculate the elementary waveforms and the waveform probabilities of the signals on the respective nets inside of the circuit. The algorithm for use in the waveform probability calculating section will be described below.

The power calculating section 206 serves to calculate the power consumption with reference to the elementary waveforms and the waveform probabilities of the signals on the respective nets inside of the circuit. The power consumption of a CMOS circuit can be obtained by calculating the frequency of the switching operation per unit time of said signal.

The frequency of the switching operation per unit time of said signal can be calculated on the basis of the equation $$\text{(The frequency of the switching operation per unit time)} = \sum_W \left( \begin{array}{c} \text{The frequency of the switching operation} \\ \text{within the elementary waveform } W \end{array} \right) \times \quad (2)$$

$$P(W)/(\text{The basic cycle}).$$

The sum is the total of all the elementary waveforms relevant to said signal.

For example, in the case of the waveform as illustrated in FIG. 3, the frequency of the switching operation per unit time can be calculated as follows.

The frequency of the switching operation and the waveform probability of the first elementary waveform from the left are 0 and 1/13 respectively.

The frequency of the switching operation and the waveform probability of the second elementary waveform from the left are 1 and 5/13 respectively.

The frequency of the switching operation and the waveform probability of the third elementary waveform from the left are 1 and 4/13 respectively.

The frequency of the switching operation and the waveform probability of the fourth elementary waveform from the left are 0 and 2/13 respectively.

The frequency of the switching operation and the waveform probability of the fifth elementary waveform from the left are 2 and 1/13 respectively. The sum of the frequency is therefore

0×(1/13)+1×(5/13)+1×(4/13)+0×(2/13)+2×(1/13)=11/13.

Figure 5:
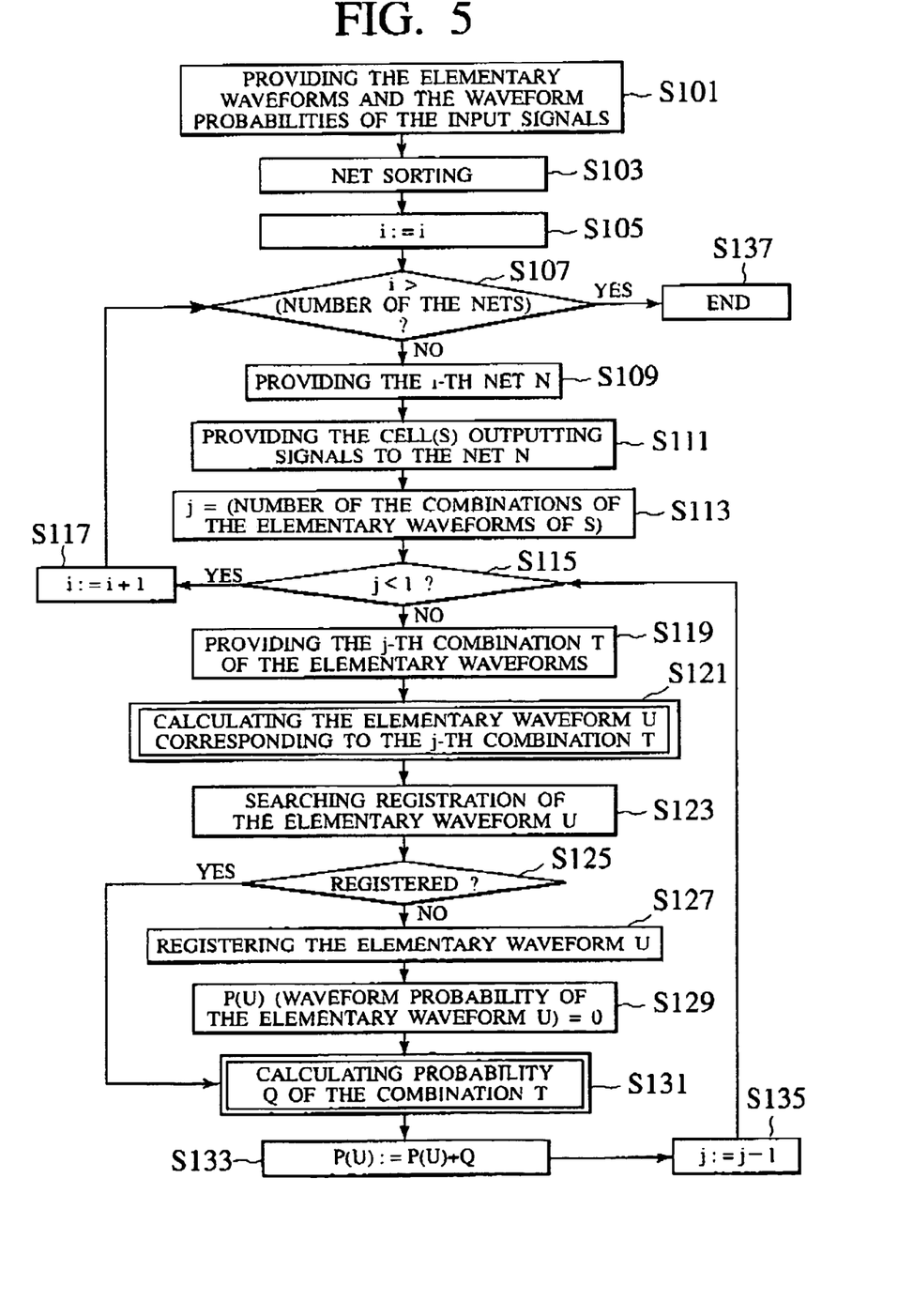
FIG. 5 is a flowchart for explaining an algorithm for use in calculating the waveform probability in accordance with the present invention.

The algorithm for use in the waveform probability calculating section 205 (the waveform probability calculation algorithm) will be explained with reference to FIG. 5 in the following description, which is the gist of the power estimation system in accordance with the present invention.

The waveform probability calculation algorithm is composed of the following processes.

(1) Provision of the elementary waveforms and the waveform probabilities of the input signals (2) Net Sorting (3) The waveform probability calculation of the nets.

The respective processes will be explained in the followings.

(1) Provision of the Elementary Waveforms and the Waveform Probabilities of the Input Signals All the elementary waveforms and the waveform probabilities of the respective primary inputs are recorded in the form of an internal data structure in the step S101.

(2) Net Sorting

Starting from the primary inputs, the respective nets are numbered by tracing the respective nets as from the input terminals of the respective cells to the output terminal of the respective cells in the step S103. In this case, however, numbering is conducted to satisfy the condition that "the signal on each net can be determined only by the signals on the nets having numbers smaller than the number of that net." Accordingly, the calculation of the waveform probabilities can be conducted in the ascending order of the number from the primary input terminals to the output terminals of the circuit.

(3) The waveform Probability Calculation of the Nets

Assuming that the waveform probability calculation of up to (i-1)th net has been completed, the procedure for the i-th net will be explained.

First of all, the i-th net N is provided in the step S109. Next, the cell(s) outputting signals to the net N is determined to obtain input nets connected to the cell(s) as the input net group S in the step S111. Also, the number of the combinations of the elementary waveforms relating to the input net group S is assigned to the variable j in the step S113.

If the number j of the combinations of the elementary waveforms is not smaller than 1, i.e., if the question posed at the decision step S115 is answered in the negative, the j-th combination T of the elementary waveforms is obtained in the step S119 in order to calculate the elementary waveform U corresponding to the j-th combination T in the step S21.

It is determined whether or not the elementary waveform U has been already registered by searching the elementary waveform U in the internal data structure in the step S128. If not registered yet, i.e., if the question posed at the decision step S125 is answered in the negative, the elementary waveform U is registered in the step S127 followed by setting the waveform probability P(U) of the elementary waveform U to 0 in the step S129.

After the step S129 or if the question posed at the decision step S125 is answered in the affirmative, the probability Q of the combination T is calculated in the step S131 and added to the probability P(U) in order to obtain the updated probability P(U) in the step S133.

The variable j is decremented by 1 in order to obtain the updated variable j in the step S135, followed by returning to the step S115. If the updated variable j is no smaller than 1, i.e., if the question posed at the decision step S115 is answered in the negative, the step S119 to the step S135 are repeated. If the updated variable j is smaller than 1, i.e., if the question posed at the decision step S115 is answered in the affirmative, the variable i is incremented by 1 in order to obtain the updated variable i in the step S117. If the updated variable i is no larger than the number of the nets, i.e., if the question posed at the decision step S107 is answered in the negative, the step S109 to the step S115 are repeated. If the updated variable 1 is larger than the number of the nets, i.e., if the question posed at the decision step S107 is answered in the affirmative, the procedure is completed in the step S137.

The number assigned to a net carrying the input signal to the i-th is no larger than i-1. Since the outputs of the cells are sequentially obtained in the order such as firstly those of the cell(s) receiving the primary inputs, secondly those of the cell(s) receiving the outputs thereof, thirdly those of the cell(s) receiving the outputs the previous cells, . . . , the elementary waveforms and the waveform probabilities of the (i-1)th net and the nets before the (i-1)th net as the input to the i-th net are known quantities.

The following steps is conducted in order to calculate the waveform probabilities of all the elementary waveforms of the output signal (the i-th net).

1. The following steps 2 to 6 are conducted respectively for the combinations of the elementary waveforms of the input signals.
2. The respective elementary waveform U responsive to each combination of the elementary waveforms of the input signals is calculated as the output signal in the step S121.
3. It is detected whether or not the elementary waveform of said output signal has been registered in the internal data structure in the step S123. If having been registered, the procedure is advanced to the step 5.
4. Said output signal of said output signal is registered in the internal data structure in the step S127. The waveform probability P(U) of said elementary waveform is set to 0 in the step S129.
5. The probability Q of said combination of the elementary waveforms of the input signals is calculated in the step S131.
6. The probability Q is added to the waveform probability P(U) in the step S133.

The main steps of the procedure as described above are the step 2 (the step S121 in FIG. 5) and the step 5 (the step S131 in FIG. 5).

Figure 6:
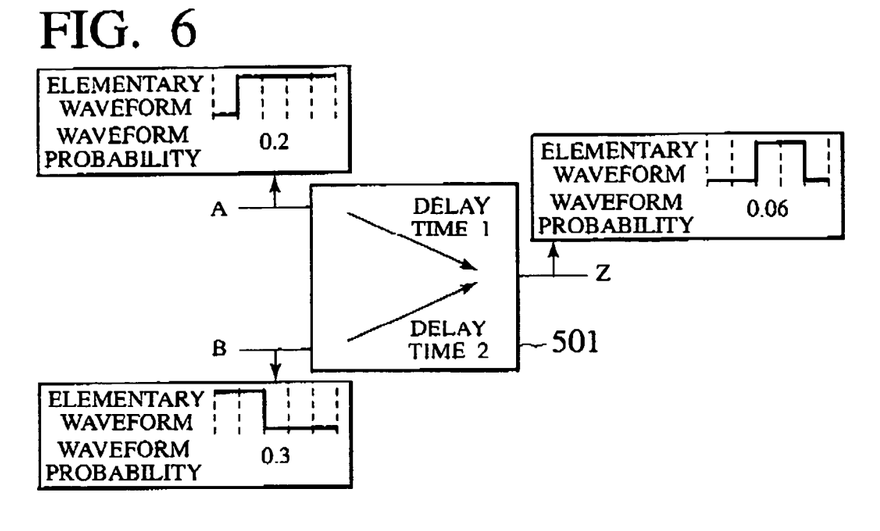
FIG. 6 is a view for explaining an example of the waveform probability calculation in accordance with the present invention.

FIG. 6 is a view for explaining an example of the waveform probability calculation in accordance with the present invention. In the following explanation, a 2-input cell will be explained with reference to FIG. 6. Needless to say, it is easy to extend the procedure to be applicable to a cell having more input terminals.

The two input terminals of the 2-input cell are A and B while the singla output terminal is Z. The elementary waveforms occurring at the node Z are obtained in correspondence with the combinations of the elementary waveforms at the nodes A and B in the step 2 (in the step S121 as illustrated in FIG. 5). In this case, however, the delay time of the cell has to be taken into consideration.

FIG. 6 is a schematic diagram showing an example with the delay time of the node A to the node Z being 1/5 of the basic cycle, the delay time of the node B to the node Z being 2/5 of the basic cycle, and the 2-input cell 501 being designed as an AND gate circuit.

The elementary waveform at the node A of the example consists of the first one-fifth of the basic cycle being 0 and the remaining second to last four-fifths of the basic cycle being 1 while the elementary waveform at the node B of the example consists of the first and second two-fifths of the basic cycle being 1 and the remaining third to last three-fifths of the basic cycle being 0.

Since the elementary waveform at the node A is transferred with the delay time of a fifth of the basic cycle and therefore shifted to the right direction by a fifth of the basic cycle, the second one-fifth of the basic cycle becomes 0, while the third to last three-fifths of the basic cycle become 1, after transferred from the node A through the cell.

Also since the elementary waveform at the node B is transferred with the delay time of two-fifths of the basic cycle and therefore shifted to the right direction by two-fifths of the basic cycle, the third and fourth two-fifths of the basic cycle becomes 1, while the last one-fifths of the basic cycle become 0, after transferred from the node B through the cell.

Since the basic waveform at the node A is transferred through the cell with the delay time to provide the second one-fifth of the basic cycle as 0, the second one-fifth of the basic cycle at the node Z is also 0. Also, since the basic waveform at the node A and the basic waveform at the node B are transferred through the cell with the delay times to provide the third and fourth two-fifths of the basic cycle as 1 respectively, the third and fourth two-fifths of the basic cycle at the node Z is also 1. Furthermore, since the basic waveform at the node B is transferred through the cell with the delay time to provide the last one-fifths of the basic cycle as 0, the last one-fifths of the basic cycle at the node Z is also 0.

The probability of the combination of the elementary waveforms at the nodes A and B as calculated in the step 6 (the step S131 in FIG. 5) is added to the waveform probability of the elementary waveform occurring at the node Z. The probability of the combination of the elementary waveforms at the nodes A and B will be explained in the followings. The probability $P(W_A \wedge W_B)$ is the probability of the combination of the elementary waveform $W_A$ at the node A and the elementary waveform $W_B$ at the node B. If there is no signal correlation between the node A and the node B, the probability $P(W_A \wedge W_B)$ satisfies $$P(W_A \wedge W_B) = P(W_A)P(W_B) \quad (3)$$

If there is a signal correlation between the node A and the node B, the probability $P(W_A \wedge W_B)$ can be evaluated by the use of the equations (4) and (5-1) which are obtained from the method as described in U.S. Pat. No. 5,847,966.

$$P(W_A \wedge W_B) = P(W_A)P(W_B) + \sum_{i=1}^{n}\sum_{\alpha<\beta} P(w_i^\alpha)P(w_i^\beta)(P(W_A \mid w_i^\alpha) - P(W_A \mid w_i^\beta))(P(W_B \mid w_i^\alpha) - P(W_B \mid w_i^\beta)) \quad (4)$$

$$P(W_A \wedge W_B \mid w_i^\alpha) = \quad (5\text{-}1)$$
$$P(W_A \mid w_i^\alpha) \times P(W_B \mid w_i^\alpha)(i = 1, \ldots, n; \alpha = 1, \ldots, m_i)$$

-continued $$P(W_A \wedge W_B) = \quad (5\text{-}2)$$
$$\sum_{\alpha} P(W_A \mid w_i^{\alpha i} \ldots w_n^{\alpha n})P(W_B \mid w_i^\alpha \ldots w_n^{\alpha i})P(w_i^{\alpha i}) \ldots P(w_n^{\alpha n}) =$$
$$\sum_{\alpha,\beta} P(W_A \mid w_i^{\alpha i} \ldots w_n^{\alpha n})P(W_B \mid w_i^{\beta i} \ldots w_n^{\beta n}) \times$$
$$P(w_i^{\alpha i} \wedge w_i^{\beta i}) \ldots P(w_n^{\alpha n} \wedge w_n^{\beta n})$$

$$P(W_A)P(W_B) = \sum_{\alpha,\beta} P(W_A \mid w_i^{\alpha i} \ldots w_n^{\alpha n})P(W_B \mid w_i^{\beta i} \ldots w_n^{\beta n}) \times \quad (5\text{-}3)$$
$$P(w_i^{\alpha i})P(w_i^{\beta i}) \ldots P(w_n^{\alpha n})P(w_n^{\beta n})$$

$$P(W_A \wedge W_B) - P(W_A)P(W_B) = \quad (5\text{-}4)$$
$$\sum_i \sum_{\alpha i,\beta i} (P(w_i^{\alpha i} \wedge w_i^{\beta i}) - P(w_i^{\alpha i})P(w_i^{\beta i})) \times$$
$$\sum_{\alpha,\beta} P(W_A \mid w_i^{\alpha i} \ldots w_n^{\alpha n})P(W_B \mid w_i^{\beta i} \ldots w_n^{\beta n}) \times$$
$$P(\hat{w}_i^{\alpha i})P(\hat{w}_i^{\beta i}) \ldots P(w_n^{\alpha n})P(w_n^{\beta n}) =$$
$$\sum_i \sum_{\alpha<\beta} P(w_i^\alpha)P(w_i^\beta)(P(W_A \mid w_i^\alpha) -$$
$$P(W_A \mid w_i^\beta))(P(W_B \mid w_i^\alpha) - P(W_B \mid w_i^\beta))$$

In the above equations, $w_i^\alpha$ designates the $\alpha$-th elementary waveform of the i-th primary input. Also, n designates the number of the primary inputs while m, designates the number of the elementary waveforms of the i-th primary input. $P(W_A \mid w_i^\alpha)$ is the conditional probability of the elementary waveform $W_A$ under the condition that the i-th primary input has the $\alpha$-th elementary waveform.

The equation (4) can be obtained as follows. If there is a signal correlation, the left hand side of the equation (3) is equal to the equation (5-2) while the right hand side of the equation (3) is equal to the equation (5-3) so that the equation (4) can be obtained from the equation (5-4).

The equation (4) and the equation (5-1) are obtained on the assumption that there is no signal correlation among the primary inputs. It is easy to extend the technique to that applicable to the case that there is a correlation among the primary inputs. Namely, there are provided groups of the primary inputs in order that the primary inputs having correlations to each other belong to the same group. $w_i^\alpha$ as described above can be redefined as the combination of the elementary waveforms of the respective groups.

The most important gist of the present invention resides in that the signal correlation is taken into consideration by the use of the equation (4) and the equation (5-1).

The conditional probabilities $P(W_A \mid w_i^\alpha)$ of the respective signals have to be calculated for making use of the equation (4) and the equation (5-1). However, it is not necessary to start from the primary inputs. The conditional probabilities $P(W_A \mid w_i^\alpha)$ can be calculated from the input signal waveform probability of the previous cells by making use of the equation (5-1).

The differences between the present embodiment of the present invention and the prior art techniques will be explained. The present embodiment is related to a kind of the probability simulator and therefore apparently distinguished from the simulation of the operation in accordance with the prior art technique.

Also, the present embodiment is different from the prior art technique CREST in that the signal correlation is taken into consideration by the use of the equation (4) and the equation (5-1).

Furthermore, the present embodiment is different from the prior art technique BAM in that the signal waveforms is taken into consideration.

In accordance with the present embodiment, the elementary waveforms and the waveform probabilities of all the signals of the circuit can be calculated on the basis of the elementary waveforms and the waveform probabilities of the primary inputs taking into consideration the signal correlation. Also, it is possible to take into consideration the deformation of waveforms and therefore the power consumption due to a glitch.

Because of this, it is possible to quickly and accurately estimate the power consumption and to lessen the circuit development time and quickly select appropriate packages for LSI circuits.

In accordance with the present embodiment, it is possible to distinguish the differences which can not be distinguished by means of CREST. For example, it is impossible to distinguish the following two cases when a probability waveform having transition probabilities at time 1 and time 2 is given in accordance with CREST.

(1) Statistical average of a waveform having transitions at time 1 and time 2

(1) Statistical average of a waveform having a transition at time 1 and a waveform having a transition at time 2

On the other hand, in accordance with the present embodiment, a waveform is handled as a statistical event so that it is possible to distinguish (1) and (2) from each other.

If the subsequent gate is an inverter which has a differential delay time between the rising time and the falling time, the transitions may possibly disappear in the case of (1). Namely, if the falling edge precedes the rising edge, the waveform can no longer be changed to have a constant value. Contrary to this, the transitions shall not disappear in the case of (2). The accuracy of estimation of the power consumption and the noise level is affected by whether or not the transitions are maintained. Accordingly, in accordance with the present embodiment capable distinguishing (1) and (2) from each other, the accuracy of estimation is improved as compared with CREST, which is not capable distinguishing (1) and (2) from each other.

Examples of waveforms of the cases (1) and (2) and the statistical average thereof will be more specifically explained with reference to FIG. 7.

Figure 7A:
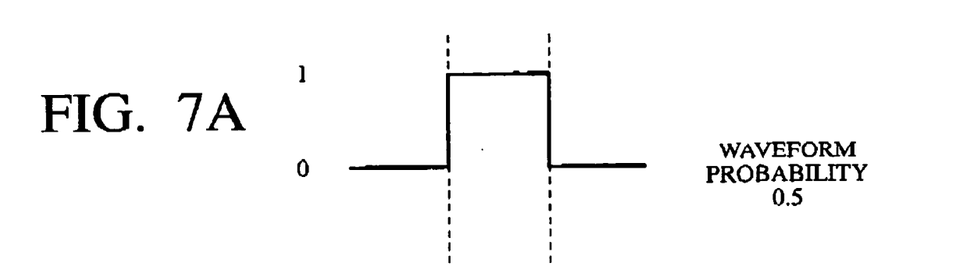
FIG. 7A shows an example of a waveform having transitions at time 1 and at time 2.

FIG. 7A shows an example of a waveform having a transition from 0 to 1 at time 1 and a transition from 1 to 0 at time 2. The waveform probability of the waveform as illustrated in the same figure is assumed to be 0.5.

Figure 7B:
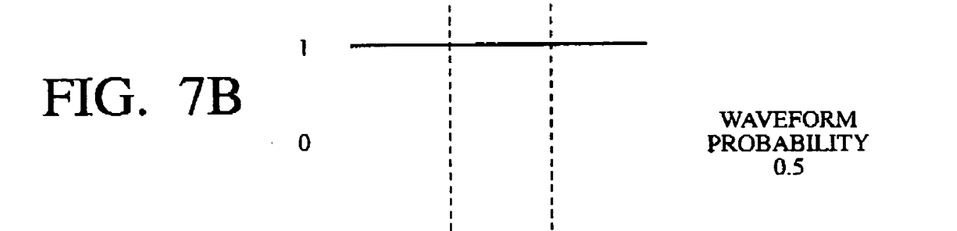
FIG. 7B shows an example of a waveform having a constant value.

FIG. 7B shows an example of a waveform having a constant value (=1). The waveform probability of the waveform as illustrated in the same figure is also assumed to be 0.5.

Figure 7C:
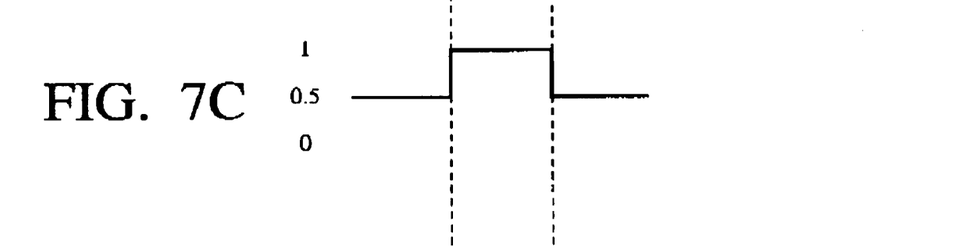
FIG. 7C shows the statistical average of the waveforms as illustrated in FIG. 7A and FIG. 7B and the statistical average of the waveforms as illustrated in FIG. 7D and FIG. 7E.

The statistical average of the waveform as illustrated in FIG. 7A and the waveform as illustrated in FIG. 7B is illustrated in FIG. 7C.

Figure 7D:
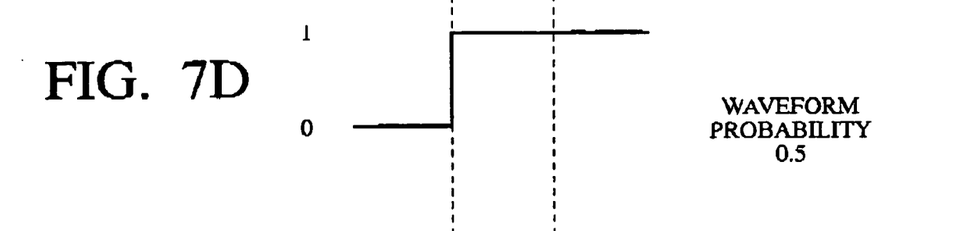
FIG. 7D shows an example of a waveform having a transition at time 1.
Figure 7E:
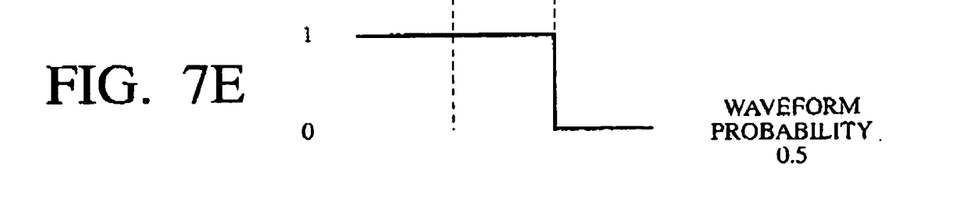
FIG. 7E shows an example of a waveform having a transition at time 2.

On the other hand, FIG. 7D shows an example of a waveform having a transition from 0 to 1 at time 1 while and FIG. 7E shows an example of a waveform having a transition from 1 to 0 at time 2. The waveform probabilities of the waveforms as illustrated in the FIG. 7D and FIG. 7E are also assumed to be 0.5 respectively.

The statistical average of the waveform as illustrated in FIG. 7D and the waveform as illustrated in FIG. 7E is also as illustrated in FIG. 7C.

In such a case, while it is impossible to distinguish the cases (1) and (2) in accordance with CREST, it is possible to distinguish (1) and (2) from each other in accordance with the present embodiment.

On the other hand, in accordance with the conventional technique BAM, only the signal probability and the switching probability are supported. In accordance with the present embodiment, the waveform probability (as different from the probability waveform of CREST) is introduced for use in calculating probabilities taking into consideration the signal correlations with similar equations as used in the conventional technique BAM. The present embodiment is different from the prior art technique BAM in that the probability calculation is conducted for different objects. In spite of the slight difference that the object being treated by the probability calculation is changed, it is possible to take into consideration the delay time and to significantly improve the accuracy of the probability calculation.

SECOND EMBODIMENT

It will be explained in a second embodiment of the present invention that the power estimation taking into consideration the capacitance between wirings is possible by the use of the method of estimating power consumption in accordance with the first embodiment. The energy $\Delta E$ as consumed by a group of the nets forming the capacitance between wirings thereof can be calculated by the equation $$\Delta E = \frac{1}{2} \sum_{ij} c_{ij} \Delta V_i \Delta V_j \qquad (6)$$

where $c_{ij}$ designates the coefficient of capacitance between the i-th net and the j-th net, and $\Delta V_i$ is the variation of the voltage level of the i-th net. The capacitance $c_i$ formed between the i-th net and the ground and the capacitance $c_{ij}$ between wirings satisfy $$\begin{cases} C_i = \sum_j c_{ij} \\ C_{ij} = -c_{ij} \end{cases} \qquad (7)$$

where Cij is the capacitance between wirings.

In accordance with the equation (6), there is a difference in the power consumption between the case that the i-th net switches alone ($\Delta V_i \neq 0$ and $\Delta V_j = 0 (j \neq i)$) and the case that a plurality of nets switch at the same time, i.e., the i-th net and the j-th net switch at the same time ($\Delta V_i \neq 0$ and $\Delta V_j \neq 0$).

The power consumption in the case that a plurality of nets switch can be calculated by the use of the method in accordance with the first embodiment. For example, if the elementary waveform $W_i$ of the i-th net and the elementary waveform $W_j$ of the j-th net share a region in which the signals on the i-th net and the j-th net switch at the same time, the energy consumption can be calculated by the use of the equations (6) while the probability of the simultaneous switching can be calculated by the use of the equations (5-1). The average energy consumption taking into consideration the capacitance between wirings can be calculated by summing the energy consumptions with weights in accordance with the probabilities.

If two nets forming the capacitance between the wirings thereof do not switch at the same time but do switch in closed timings so that the interaction is not negligible, the energy consumption can be estimated by interpolating between the energy consumption in the case of the simultaneous switching and the energy consumption in the case that there is no interaction (switching occurs separately).

An example of the interpolation will be explained.

Let t1 and t2 be the switching times of the net 1 and the net 2.

Also, let $\Delta t$ be the maximum time interval with which the interaction is not negligible. Namely, when $|t1-t2|$ is no larger than $\Delta t$, the interaction is not negligible. However, when $|t1-t2|$ is larger than $\Delta t$, the interaction is negligible. Furthermore, let $r=|t1-t2|/\Delta t$.

In the case of the simultaneous switching, t1=t2 and then r=0. Let E1 be the energy consumption in this case. On the other hand, let E2 be the energy consumption when the two nets separately switch (the interaction is negligible), i.e., when r>1.

When 0<r<1, the energy consumption can be the interpolated as the energy consumption=E1×(1−r)+E2×r Since the power estimation is possible taking the capacitance between wirings into consideration in the case of the present embodiment, it is possible to estimate the power consumption with high accuracy taking into consideration the influence of the capacitance between wirings which increases as the miniaturization of LSI circuits is advanced.

THIRD EMBODIMENT

Figure 8:
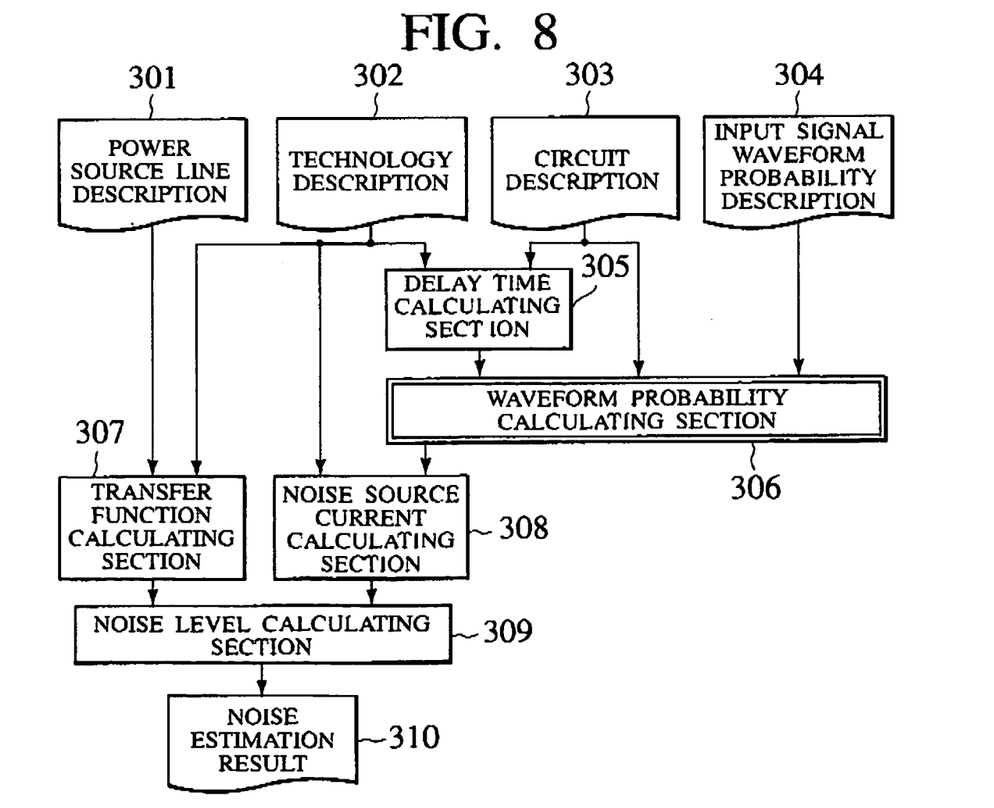
FIG. 8 is a view for explaining the system in accordance with a third embodiment of the present invention.

In the third embodiment of the present invention, a power source noise estimation system for estimating power noise (the noise leaking through a power source line from the inside of an LSI) on the basis of waveform probability calculation will be explained in conjunction with FIG. 8. The power source noise estimation system in accordance with the present embodiment is different from the power source estimation system in accordance with a conventional technique in that it is provided with a function to calculate the waveform probability taking into consideration both the signal waveform and the signal correlation.

The power source noise estimation system in accordance with the present embodiment is designed to accept a power source line description 301, a technology description 302, a circuit description 303 and an input signal waveform probability description 304, and composed of a delay time calculating section 305, a waveform probability calculating section 306, a noise source current calculating section 308, a transfer function calculating section 307 and a noise level calculating section 309, and serves to output a noise estimation result 310. These elements will be explained in details.

The power source line description 301 includes the geometric information of power source lines and the information about geometric connection among cells and the power source lines. The description of power source lines and the description of circuits are treated together in many circuit description languages which have been broadly used. However, these descriptions are separately treated herein for the sake of making clear the flow of the procedures.

The technology description 302 contains information indispensable for the power estimation on the basis of the waveform probability calculation. More specifically speaking, for example, there is provided following information; i.e., the parameters for calculating the delay time of signals from the input terminals to the output terminals of the respective cell; and the power consumption per switching for each terminal of a cell, the capacitance, the resistance and the inductance per unit length of the power lines and wirings for interconnection of cells.

The circuit description 303 contains the information about connection among cells and nets.

The input signal waveform probability description 304 contains the information about types of elementary waveforms of primary inputs which are used for starting calculation by means of the waveform probability calculating section 205, and the information about the waveform probabilities of the elementary waveforms at the primary input terminals. The primary inputs are given as the input signals to the entirety of the circuit and the output signals from the flip-flops. The elementary waveforms and the waveform probabilities of the output signals from the flip-flops can be obtained by the simulation of the operation, in which delay times are not taken into consideration, at the initial stages of a designing procedure (RT level and so forth).

The delay time calculating section 305 serves to calculate, on the basis of the circuit description and the technology description, the delay time from the input terminal to the output terminal of a cell and the delay time of a signal on a net from the output terminal of one cell to the input terminal of another cell.

The waveform probability calculating section 306 serves to propagate the elementary waveforms and the waveform probabilities of the primary inputs through the inside of the circuit in order to calculate the elementary waveforms and the waveform probabilities of the signals on the respective nets inside of the circuit. In this case, the waveform probability calculation algorithm in accordance with the first embodiment is used.

The noise source current calculating section 308 serves to calculate the electric current levels at the current source pins of the respective cells and the occurrence probabilities of the electric current at the current source pins. More specifically speaking, the noise source current calculating section 308 conducts the calculation as follows. Calculated for each cell are the current waveforms at the power source pins of said each cell (called the elementary current waveforms) for every combination of the elementary waveforms of the input/output signals by the use of the information of the technology description. The occurrence probability of the elementary current waveform (hereafter called the current waveform probability) is identical to the occurrence probability of the combination as described above. The occurrence probability can be calculated by repeating application of the equation (4) in the same manner as the waveform probability calculation algorithm. In the case that the same elementary current waveform is derived from either of different combinations of the elementary waveforms of the input/output signals, the occurrence probabilities of such different combinations are summed up. The elementary current waveforms and the current waveform probabilities of the respective cells can be obtained by the procedures as described above.

The transfer function calculating section 307 serves to calculate the transfer function from a power source pin of a cell as a noise source to a power source pad to which the noise is transferred in accordance with an appropriate approximation technique such as AWE (Asymptonic Waveform Evaluation).

The noise level calculating section 309 serves to calculate the frequency distributions of the noise levels at the power source pads with reference to the elementary current waveforms, the current waveform probabilities and the transfer functions of a noise source (a cell). More specifically speaking, the noise source current calculating section 308 conducts the calculation as follows.

The mean square $\langle I_{OUT}(\omega)^2 \rangle$ scan be expressed by the equation $$\langle |I_{OUT}(\omega)|^2 \rangle = \sum_{i,j} (G_i(\omega))^* G_j(\omega) A_{ij}(\omega) \quad (8)$$

$$A_{ij}(\omega) = \sum_{\alpha,\beta} \left(\hat{I}_i^\alpha(\omega)\right)^* \hat{I}_j^\beta(\omega) F_{ij}^{\alpha\beta}(\omega) \quad (9)$$

$$F_{ij}^{\alpha\beta}(\omega) = \frac{1}{N^2} \sum_{m=0}^{} \sum_{n=0}^{} e^{\sqrt{-1}\omega T(m-n)} P((m, I_i^\alpha) \wedge (n, I_j^\beta)) \quad (10)$$

where "*" is used to indicate complex conjugate; "^" is used to indicate Fourier transformation; "ω" is the angular frequency; "T" is the basic cycle; "N" is the noize measurement time divided by the basic cycle; "i" and "j" are the reference numerals to noise sources; "α" and "β" are reference numerals to the elementary current waveforms at the i-th and j-th noise sources; "$I_i^\alpha$" and "$I_j^\alpha$" are the α-th and a th elementary current waveforms at the i-th and j-th noise sources; $G_i$ is the transfer function from the i-th noise source to the power source pads; and $P((m,I_i^\alpha) \wedge (n,I_j^\alpha))$ is the probability that the elementary current waveform $I_i^\alpha$ occurs in the i-th noise source in the cycle m and that the elementary current waveform $I_i^\alpha$ occurs in the j-th noise source in the cycle n. Fourier transformation is defined as $$\hat{I}_i^\alpha(\omega) = \frac{1}{T} \int_0^T dt\, e^{-\sqrt{-1}\omega t} I_i^\alpha(t) \quad (11)$$

It is necessary for accurately obtain $P((m,I_i^\alpha) \wedge (n,I_j^\alpha))$ to calculate taking into consideration the temporary correlations of the waveform probabilities (the correlation between different cycles) and the spatial correlations (the correlation between different noise sources). However, the time required for completing the calculation is proportional to (The number of the noise sources)$^2 \times$(The number of the elementary current waveform)$^2 \times$(The number of cycles)$^2$ and therefore is expected to be a very long processing time. An approximation technique is then indispensable. One example of such approximation techniques will be explained hereafter.

(1) In the case that i≠j (1.1) In the case that m≠n

The temporary correlation and the spatial correlation are igonred. Namely, $P((m,I_i^\alpha) \wedge (n,I_j^\alpha)) \square P(m,I_i^\alpha) P(n,I_j^\alpha)).$ (1.2) In the case that m=n Only the spatial correlation is taken into consideration because of the same time, so that the equation (4) is applicable. (2) In the case that i=j There is no longer the problem of the spatial correlation because of the same noise source, so that only the temporary correlation is taken into consideration. In order to take the temporary correlation into consideration, the idea of "the waveform transition probability" is introduced. The waveform transition probability is the probability related to a signal that, when the elementary waveform $W^\alpha$ occurs in cycle 0, the elementary waveform $W^\beta$ occurs in cycle 1 subsequent to cycle 0 and expressed as $P(W^\alpha \rightarrow W^\beta)$. The waveform transition probability is just a conditional probability, i.e., $P(W^\alpha \rightarrow W^\beta) = P((0,W^\alpha) \wedge (0,W^\beta))/P(W^\beta)$ The waveform transition probability of each signal can be calculated by the use of an equation corresponding to the equation (4). The transition probabilities of the elementary current waveforms (hereafter called the current waveform transition probabilities) at the power source pins can be calculated from the waveform transition probabilities of the input/output signals in the same manner as the current waveform probabilities. Once the current waveform transition probabilities and the current waveform probabilities have been obtained, it is possible to calculate $P((m,I_i^\alpha) \wedge (n,I_j^\alpha))$ on the assumption that the transition takes place as a Markov chain.

In the case of the present embodiment, it is possible to estimate the average level of the power source noise appearing on the power source pads from the respective cells (the noise sources) inside of the circuit through the power lines. The power source noise can therefore be quickly and accurately estimated so as to make it possible to quickly solve noise problems and lessen the circuit development time.

FOURTH EMBODIMENT

In a waveform probability calculating process, it is sometimes the case that the number of the elementary waveforms of a certain signal is extremely increased to require a long calculation time. In order to avoid such a case, any one of or all of the following procedures can be conducted.

(4.1) The basic cycle is divided into several blocks. The the basic waveforms having the same pattern of transitions at the boundaries between the adjacent blocks (0→0, 0→1, 1→0, 1→1) is commonly treated as a single basic waveform.

(4.2) The basic waveforms having relatively low waveform probabilities are ignored.

One example of the above procedure (4.1) will be explained with reference to FIG. 9. In FIG. 9, the basic cycle is divided into two large blocks, each of which is divided again into four small blocks.

Figure 9A:
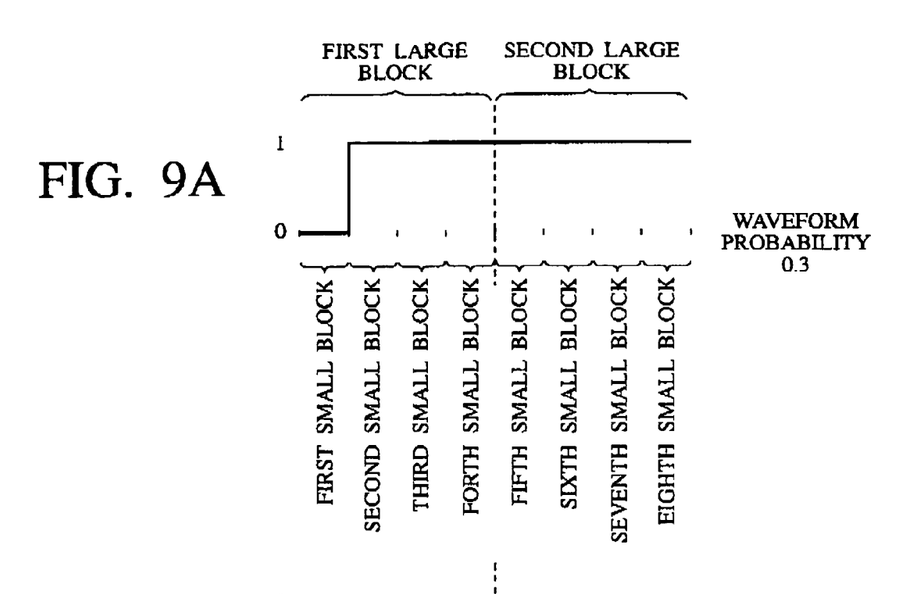
FIG. 9A shows the waveform which is 0 in the first small block and 1 in the second through eighth small blocks with a transition from 0 to 1 at the boundary between the first small and the second small block.

FIG. 9A illustrates the waveform which is 0 in the first small block and 1 in the second through eighth small blocks with a transition from 0 to 1 at the boundary between the first small and the second small block. The waveform probability thereof is assumed to be 0.3.

Figure 9B:
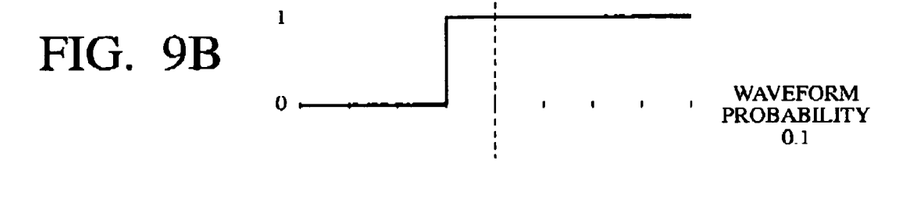
FIG. 9B shows the waveform which is 0 in the first through third small blocks and 1 in the fourth through eighth small blocks with a transition from 0 to 1 at the boundary between the third small and the fourth small block.

FIG. 9B illustrates the waveform which is 0 in the first through third small blocks and 1 in the fourth through eighth small blocks with a transition from 0 to 1 at the boundary between the third small and the fourth small block. The waveform probability thereof is assumed to be 0.1.

The waveform as illustrated in FIG. 9A and the waveform as illustrated in FIG. 9B are different from each other in the transition time, i.e., different waveforms.

However, the first waveform and the second waveform can be recognized to be the same waveform as long as viewed only from the three points, i.e., the starting point of the basic cycle, the boundary between the first large block and the second large block and the terminating point of the basic cycle. Namely, either waveform is 0 at the starting point of the basic cycle, 1 at the boundary between the first large block and the second large block and 1 at the terminating point of the basic cycle. In other words, either waveform has the same transition pattern as 0->1 in the first large block and 1->1 in the second large block.

Figure 9C:
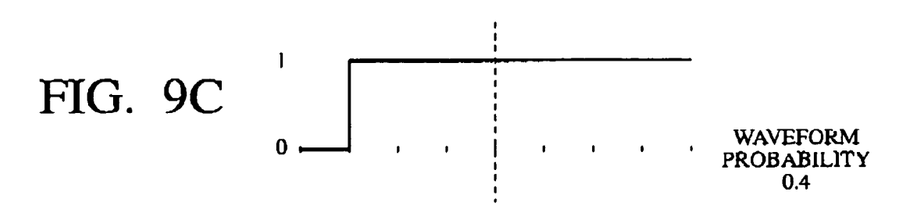
FIG. 9C shows the waveform which is 0 in the first large block and 1 in the second large block with a transition from 0 to 1 at the boundary between the first and second large blocks

Such two elementary waveforms are unified as a single elementary waveform as illustrated in FIG. 9C. The unified elementary waveform has a lone switching point at the boundary between the first small block and the second small block. The same pattern of transitions is 0→1 in the first large block and 1→1 in the second large block. The waveform probability of a unified elementary waveform is the sum of the waveform probabilities of the elementary waveforms which are unified into that unified elementary waveform. In the case as illustrated in FIG. 9, 0.3+0.1=0.4.

In accordance with the present embodiment, it is possible to make effective the waveform probability calculation, reduce the processing time and lessen the circuit development time by neglecting small differences between the elementary waveforms and unifying similar elementary waveforms.

What is claimed is:

1. A method of estimating power consumption and noise levels of an integrated circuit which is composed of logic gates connected in the form of a plurality of stages, comprising the steps of:
    calculating a first set of output signal elementary waveforms and occurrence probabilities thereof at the first stage of the logic gates by the use of signal waveforms and occurrence probabilities thereof at primary input terminals of the integrated circuit;
    calculating a second set of output signal elementary waveforms and occurrence probabilities thereof at the second stage of the logic gates by the use of said signal waveforms and said occurrence probabilities thereof at said primary input terminals and said first set of output signal elementary waveforms and said occurrence probabilities thereof at the first stage of the logic gates; and in the same manner
    calculating an n-th set (n is a natural number) of output signal elementary waveforms and occurrence probabilities thereof at the n-th stage of the logic gates by the use of said signal waveforms and said occurrence probabilities thereof at said primary input terminals and an (n-1)th set of output signal elementary waveforms and occurrence probabilities thereof at the (n-1)th stage of the logic gates,
    estimating power consumption and noise levels based on at least the n sets of output signal elementary waveforms and occurrence probabilities thereof,
    wherein types of the respective elementary waveforms, occurrence probabilities and signal correlations are calculated relating to signals located on each wiring of each stage inside of the integrated circuit and occurring within a predetermined time period.

2. The method of estimating power consumption and noise levels of an integrated circuit as claimed in claim 1 wherein calculating occurrence probabilities further comprises calculating a probability $P(W_A \wedge W_B)$ of the combination of an elementary waveform $W_A$ at one input terminal and an elementary waveform $W_B$ at another input terminal, according to a formula:

$$P(W_A \wedge W_B) = P(W_A)P(W_B) + \sum_{i=1}^{n}\sum_{\alpha<\beta} P(w_i^\alpha)P(w_i^\beta)(P(W_A|w_i^\alpha) - P(W_A|w_i^\beta))(P(W_B|w_i^\alpha) - P(W_B|w_i^\beta))$$

where $w_i^\alpha$ designates the α-th elementary waveform of the i-th primary input;
n designates the number of the primary inputs; and
$P(W_A|w_i^\alpha)$ is the conditional probability of the elementary waveform $W^A$ under the condition that the α-th elementary waveform occurs at the i-th primary input terminal.

3. The method of estimating power consumption and noise levels of an integrated circuit as claimed in claim 2 further comprising:
    a step of assigning $P(W_A)*P(W_B)$ to $P(W_A \wedge W_B)$;
    a step of setting the initial values of i and α to 1 and β to a α+1;
    a step of incrementing $P(W_A \wedge W_B)$ by
    $P(w_i^\alpha)(P(w_i^\beta)(P(W_A|W_i^\beta)-P(W_A|w_i^\beta))(P(W_B|w_i^\alpha)-P(W_B|w_i^\beta))$
    a first loop in which $P(W_A \wedge W_B)$ is incremented by
    $P(w_i^\alpha)(P(w_i^\beta)(P(W^A|w_i^\alpha)-P(W_A|w_i^\beta))(P(W_B|w_i^\alpha)-P(W_B|w_i^\beta))$
    anew each time β is incremented by 1 in steps from α+1 to the number of types of the elementary waveforms of said another input terminal;
    a second loop in which, each time β reaches the number of types of the elementary waveforms of said another input terminal, α is incremented by 1 followed by returning to said first loop, said second loop being repeated until α reaches to the number of types of the elementary waveforms of said one input terminal; and
    a third loop in which, each time α reaches to the number of types of the elementary waveforms of said one input terminal, i is incremented by 1 followed by returning to said second loop, said third loop being repeated until i reaches to the number of the primary input terminals.

4. The method of estimating power consumption and noise levels of an integrated circuit as claimed in claim 1 wherein said predetermined time period is divided into a plurality of time blocks; and wherein, if elementary waveforms have the same pattern of signal transitions as considered only at the boundary between each of adjacent time blocks, such elementary waveforms are recognized as the same elementary waveform even in the case that there is a difference therebetween inside of a time block.

5. The method of estimating power consumption and noise levels of an integrated circuit as claimed in claim 1 wherein, in the step of calculating the types of the respective elementary waveforms, the occurrence probabilities and the signal correlations relating to signals located on each wiring of each stage inside of the integrated circuit and occurring within a predetermined time period, the occurrence probabilities of the signal waveforms are calculated without taking into consideration those of said signal waveforms whose said occurrence probabilities are no higher than a predetermined value.

6. The method of estimating power consumption and noise levels of an integrated circuit as claimed in claim 4 wherein, in the step of calculating the types of the respective elementary waveforms, the occurrence probabilities and the signal correlations relating to signals located on each wiring of each stage inside of the integrated circuit and occurring within a predetermined time period, the occurrence probabilities of the signal waveforms are calculated without taking into consideration those of said signal waveforms whose said occurrence probabilities are no higher than a predetermined value.

7. A computer-readable recording medium storing a program for estimating power consumption and noise levels of an integrated circuit which is composed of logic gates connected in the form of a plurality of stages, comprising the steps of:

calculating a first set of output signal elementary waveforms and occurrence probabilities thereof at the first stage of the logic gates by the use of signal waveforms and occurrence probabilities thereof at primary input terminals of the integrated circuit;

calculating a second set of output signal elementary waveforms and occurrence probabilities thereof at the second stage of the logic gates by the use of said signal waveforms and said occurrence probabilities thereof at said primary input terminals and said first set of output signal elementary waveforms and said occurrence probabilities thereof at the first stage of the logic gates; and in the same manner calculating an n-th set (n is a natural number) of output signal elementary waveforms and occurrence probabilities thereof at the n-th stage of the logic gates by the use of said signal waveforms and said occurrence probabilities thereof at said primary input terminals and an (n-1)th set of output signal elementary waveforms and occurrence probabilities thereof at the (n-1)th stage of the logic gates, estimating power consumption and noise levels based on at least the n sets of output signal elementary waveforms and occurrence probabilities thereof, wherein types of the respective elementary waveforms, occurrence probabilities and signal correlations are calculated relating to signals located on each wiring of each stage inside of the integrated circuit and occurring within a predetermined time period.

8. The computer-readable recording medium storing the program for estimating power consumption and noise levels of an integrated circuit as claimed in claim 7 wherein calculating occurrence probabilities further comprises calculating a probability $P(W_A \wedge W_B)$ of the combination of an elementary waveform $W_A$ at one input terminal and an elementary waveform $W_B$ at another input terminal, according to a formula:

$$P(W_A \wedge W_B) = P(W_A)P(W_B) + \sum_{i=1}^{n} \sum_{\alpha < \beta} P(w_i^\alpha) P(w_i^\beta)(P(W_A | w_i^\alpha) - P(W_A | w_i^\beta))(P(W_B | w_i^\alpha) - P(W_B | w_i^\beta))$$

where $w_i^\alpha$ designates the $\alpha$-th elementary waveform of the i-th primary input; and n designates the number of the primary inputs;

$P(W_A|w_i^\alpha)$ is the conditional probability of the elementary waveform $W_A$ under the condition that the $\alpha$-th elementary waveform occurs at the i-th primary input terminal.

9. The computer-readable recording medium storing the program for estimating power consumption and noise levels of an integrated circuit as claimed in claim 8 further comprising:

a step of assigning $P(W_A)*P(W_B)$ to $P(W_A \wedge W_B)$;
a step of setting the initial values of i and $\alpha$ to 1 and $\beta$ to $\alpha+1$;
a step of incrementing $P(W_A \wedge W_B)$ by $P(w_i^\alpha)(P(w_i^\beta)(P(W_A|w_i^\alpha)-P(W_A|w_i^\beta))(P(W_B|w_i^\alpha)-P(W_B|w_i^\beta)))$ a first loop in which $P(W_A \wedge W_B)$ is incremented by $P(w_i^\alpha)(P(w_i^\beta)(P(W_A|w_i^\alpha)-P(W_A|w_i^\beta))(P(W_B|w_i^\alpha)-P(W_B|w_i^\beta))$ anew each time $\beta$ is incremented by 1 in steps from $\alpha+1$ to the number of types of the elementary waveforms of said another input terminal;

a second loop in which, each time $\beta$ reaches the number of types of the elementary waveforms of said another input terminal, $\alpha$ is incremented by 1 followed by returning to said first loop, said second loop being repeated until $\alpha$ reaches to the number of types of the elementary waveforms of said one input terminal; and a third loop in which, each time a reaches to the number of types of the elementary waveforms of said one input terminal, i is incremented by 1 followed by returning to said second loop, said third loop being repeated until i reaches to the number of the primary input terminals.

10. The computer-readable recording medium storing the program for estimating power consumption and noise levels of an integrated circuit as claimed in claim 7 wherein said predetermined time period is divided into a plurality of time blocks; and wherein, if elementary waveforms have the same pattern of signal transitions as considered only at the boundary between each of adjacent time blocks, such elementary waveforms are recognized as the same elementary waveform even in the case that there is a difference therebetween inside of a time block.

11. The computer-readable recording medium storing the program for estimating power consumption and noise levels of an integrated circuit as claimed in claim 7 wherein, in the step of calculating the types of the respective elementary waveforms, the occurrence probabilities and the signal correlations relating to signals located on each wiring of each stage inside of the integrated circuit and occurring within a predetermined time period, the occurrence probabilities of the signal waveforms are calculated without taking into consideration those of said signal waveforms whose said occurrence probabilities are no higher than a predetermined value.

12. The computer-readable recording medium storing the program for estimating power consumption and noise levels of an integrated circuit as claimed in claim 10 wherein, in the step of calculating the types of the respective elementary waveforms, the occurrence probabilities and the signal correlations relating to signals located on each wiring of each stage inside of the integrated circuit and occurring within a predetermined time period, the occurrence probabilities of the signal waveforms are calculated without taking into consideration those of said signal waveforms whose said occurrence probabilities are no higher than a predetermined value.

13. A computer program product for estimating power consumption and noise levels of an integrated circuit which is composed of logic gates, the computer program product comprising:

instructions for calculating a first set of output signal elementary waveforms and occurrence probabilities thereof at a first stage of the logic gates by the use of signal waveforms and occurrence probabilities thereof at primary input terminals of the integrated circuit;

instructions for calculating a second set of output signal elementary waveforms and occurrence probabilities thereof at a second stage of the logic gates by the use of said signal waveforms and said occurrence probabilities thereof at said primary input terminals and said first set of output signal elementary waveforms and said occurrence probabilities thereof at the first stage of the logic gates; and in the same manner instructions for calculating an n-th set (n is a natural number) of output signal elementary waveforms and occurrence probabilities thereof at an n-th stage of the logic gates by the use of said signal waveforms and said occurrence probabilities thereof at said primary input terminals and an (n-1)th set of output signal elementary waveforms and occurrence probabilities thereof at an (n-1)th stage of the logic gates, instructions for estimating power consumption and noise levels based on at least the n sets of output signal elementary waveforms and occurrence probabilities thereof, wherein types of the respective elementary waveforms, occurrence probabilities and signal correlations are calculated relating to signals located on each wiring of each stage inside of the integrated circuit and occurring within a predetermined time period.

14. The computer program product of claim 13 wherein calculating occurrence probabilities further comprises calculating a probability $P(W_A \wedge W_B)$ of the combination of an elementary waveform $W_A$ at one input terminal and an elementary waveform $W_B$ at another input terminal, according to a formula:

$$P(W_A \wedge W_B) = P(W_A)P(W_B) + \sum_{i=1}^{n} \sum_{\alpha < \beta} P(w_i^\alpha) P(w_i^\beta) \left( P(W_A | w_i^\alpha) - P(W_A | w_i^\beta) \right) \left( P(W_B | w_i^\alpha) - P(W_B | w_i^\beta) \right)$$

where $w_i^\alpha$ designates the $\alpha$-th elementary waveform of the i-th primary input; and n designates the number of the primary inputs; and $P(W_A | w_i^\alpha)$ is the conditional probability of the elementary waveform $W_A$ under the condition that the $\alpha$-th elementary waveform occurs at the i-th primary input terminal.

15. The computer program product of claim 14 wherein calculating occurrence probabilities further comprises:

instructions for assigning $P(W_A)*P(W_B)$ to $P(W_A \wedge W_B)$;

instructions for setting the initial values of i and $\alpha$ respectively to 1 and $\beta$ to $\alpha$+1;

instructions for incrementing $P(W_A \wedge W_B)$ by $P(w_i^\alpha)(P(W_i^\beta)(P(W_A|w_i^\alpha)-P(W_A|w_i^\beta))(P(W_B|w_i^\alpha)-P(W_B|w_i^\beta))$ a first loop in which $P(W_A \wedge W_B)$ is incremented by $P(w_i^\alpha)(P(w_i^\beta)(P(W_A|W_i^\alpha)-P(W_A|w_i^\beta))(P(W_B|w_i^\alpha)-P(W_B|w_i^\beta))$ anew each time $\beta$ is incremented by 1 in steps from $\alpha$+1 to the number of types of the elementary waveforms of said another input terminal;

a second loop in which, each time $\beta$ reaches the number of types of the elementary waveforms of said another input terminal, $\alpha$ is incremented by 1 followed by returning to said first loop, said second loop being repeated until $\alpha$ reaches to the number of types of the elementary waveforms of said one input terminal; and a third loop in which, each time $\alpha$ reaches to the number of types of the elementary waveforms of said one input terminal, i is incremented by 1 followed by returning to said second loop, said third loop being repeated until i reaches to the number of the primary input terminals.

16. The computer program product of claim 13 wherein said predetermined time period is divided into a plurality of time blocks; and wherein, if elementary waveforms have the same pattern of signal transitions as considered only at the boundary between each adjacent time blocks, such elementary waveforms are recognized as the same elementary waveform even in the case that there is a difference therebetween inside of a time block.

17. The computer program product of claim 13 wherein, in calculating the types of the respective elementary waveforms, the occurrence probabilities and the signal correlations relating to signals located on each wiring of each stage inside of the integrated circuit and occurring within a predetermined time period, the occurrence probabilities of the signal waveforms are calculated without taking into consideration those of said signal waveforms whose said occurrence probabilities are no higher than a predetermined value.

18. The computer program product of claim 16 wherein, in calculating the types of the respective elementary waveforms, the occurrence probabilities and the signal correlations relating to signals located on each wiring of each stage inside of the integrated circuit and occurring within a predetermined time period, the occurrence probabilities of the signal waveforms are calculated without taking into consideration those of said signal waveforms whose said occurrence probabilities are no higher than a predetermined value.

* * * * *